US011670972B2

(12) United States Patent
Ruscher et al.

(10) Patent No.: US 11,670,972 B2
(45) Date of Patent: Jun. 6, 2023

(54) ELECTRONIC DEVICE HAVING AN INDUCTIVE CHARGING SYSTEM

(71) Applicant: Apple Inc., Cupertino, CA (US)

(72) Inventors: Joel N. Ruscher, Fremont, CA (US); Blake R. Marshall, San Jose, CA (US); Marco Soldano, San Jose, CA (US); Liquan Tan, Sunnyvale, CA (US); Todd K. Moyer, Portland, OR (US); Reza Nasiri Mahalati, Belmont, CA (US); Victor Luzzato, Taipei (TW); Wai Man Raymund Kwok, Hong Kong (CN)

(73) Assignee: APPLE INC., Cupertino, CA (US)

( * ) Notice: Subject to any disclaimer, the term of this patent is extended or adjusted under 35 U.S.C. 154(b) by 703 days.

(21) Appl. No.: 16/568,066

(22) Filed: Sep. 11, 2019

(65) Prior Publication Data

US 2020/0099245 A1 Mar. 26, 2020

Related U.S. Application Data

(60) Provisional application No. 62/735,656, filed on Sep. 24, 2018.

(51) Int. Cl.
*G06F 1/26* (2006.01)
*H02J 7/00* (2006.01)
(Continued)

(52) U.S. Cl.
CPC .............. *H02J 50/90* (2016.02); *G06F 1/266* (2013.01); *H01F 38/14* (2013.01); *H02J 7/0042* (2013.01);
(Continued)

(58) Field of Classification Search
CPC .......... H02J 7/025; H02J 5/005; H02J 7/0042; H02J 2207/20; H02J 50/10; H02J 7/02;
(Continued)

(56) References Cited

U.S. PATENT DOCUMENTS 5,023,408 A * 6/1991 Murakami .............. G06F 3/046
178/18.07
10,404,089 B2 9/2019 Kasar et al.
(Continued)

FOREIGN PATENT DOCUMENTS

CN 101558545 A 10/2009
CN 102377250 A 3/2012
(Continued)

OTHER PUBLICATIONS

International Preliminary Report on Patentability issued in PCT Application No. PCT/US2019/051085, dated Apr. 1, 2021 in 8 pages.
(Continued)

*Primary Examiner* — Stacy Whitmore
(74) *Attorney, Agent, or Firm* — Kilpatrick Townsend and Stockton, LLP

(57) ABSTRACT

An electronic device includes a housing coupled to a display window, a battery and a plurality of inductive charging transmit coils coupled to the battery. The plurality of inductive charging coils are positioned within the enclosure to generate an inductive charging region that extends through the display window and across at least a portion of an exterior of the display window. Sensing circuitry is configured to sense a position of a stylus at the display window and a processor is configured to selectively engage and disengage one or more of the plurality of inductive charging
(Continued)

transmit coils based on the sensed position of the stylus. The stylus receives power when it is positioned within the inductive charging window.

20 Claims, 7 Drawing Sheets

(51) Int. Cl.

| | | |
|---|---|---|
| *H01F 38/14* | (2006.01) | |
| *H02J 50/90* | (2016.01) | |
| *H02J 50/00* | (2016.01) | |
| *H02J 50/40* | (2016.01) | |
| *H02J 50/10* | (2016.01) | |
| *H02J 7/02* | (2016.01) | |

(52) U.S. Cl.
CPC .............. *H02J 7/02* (2013.01); *H02J 50/005* (2020.01); *H02J 50/10* (2016.02); *H02J 50/402* (2020.01); *H02J 2207/20* (2020.01)

(58) Field of Classification Search
CPC ........ H02J 50/005; H02J 50/402; H02J 50/90; H02J 7/342; G06F 1/266; G06F 3/0383; G06F 2203/0384; G06F 1/1698; G06F 1/1635; G06F 3/03545; G06F 1/1626; H01F 38/14; H01F 27/2804
See application file for complete search history.

(56) References Cited

U.S. PATENT DOCUMENTS

| | | | |
|---|---|---|---|
| 10,651,685 B1* | 5/2020 | Herbst ................... | H02J 7/025 |
| 2013/0026981 A1 | 1/2013 | Van Der Lee | |
| 2015/0277592 A1 | 10/2015 | Nishigaki | |
| 2015/0324018 A1* | 11/2015 | Hinson ................. | G06F 3/0446 |
| | | | 345/179 |
| 2015/0371768 A1 | 12/2015 | Graham et al. | |
| 2016/0291785 A1* | 10/2016 | Mizuhashi ............ | G06F 3/0412 |
| 2018/0069423 A1* | 3/2018 | Klawon ................. | H02J 50/10 |
| 2018/0287413 A1* | 10/2018 | Jung ..................... | H02J 7/025 |
| 2018/0329527 A1* | 11/2018 | Park ..................... | G06F 3/03545 |
| 2019/0324564 A1* | 10/2019 | Brunet ................. | G06F 1/3287 |
| 2020/0006984 A1* | 1/2020 | Kim ...................... | H02J 7/025 |
| 2020/0215925 A1* | 7/2020 | Partovi ................. | H01F 38/14 |

FOREIGN PATENT DOCUMENTS

| | | |
|---|---|---|
| CN | 103248094 A | 8/2013 |
| CN | 103296785 A | 9/2013 |
| CN | 103812149 A | 5/2014 |
| CN | 106605353 A | 4/2017 |
| CN | 206711738 U | 12/2017 |
| WO | WO-2018009557 A1 * | 1/2018 ............. H02J 50/40 |
| WO | 2018106762 A1 | 6/2018 |

OTHER PUBLICATIONS

Utility Model Patentability Evaluation Report issued in China Application No. CN201921520416.0, dated Aug. 24, 2020 in 3 pages.
Utility Model Patentability Evaluation Report issued in China Application No. CN201921520416.0, dated May 18, 2020 in 6 pages.
Burks, et al., "Self-Charging Stylus Pen", Research Disclosure, vol. 642, No. 121, dated Oct. 1, 2017 in 2 pages.
International Search Report and Written Opinion issued in PCT Application No. PCT/US 2019/051085, dated Nov. 8, 2019 in 13 pages.

* cited by examiner

ELECTRONIC DEVICE HAVING AN INDUCTIVE CHARGING SYSTEM

CROSS-REFERENCES TO OTHER APPLICATIONS

This application claims priority to U.S. provisional patent application Ser. No. 62/735,656 for "ELECTRONIC DEVICE HAVING AN INDUCTIVE CHARGING SYSTEM" filed on Sep. 24, 2018 which is hereby incorporated by reference in entirety for all purposes.

FIELD

The described embodiments relate generally to electronic devices that include a corresponding pointing device that is inductively charged by the electronic device. More particularly, the present embodiments relate to tablet computers that inductively charge and communicate with a corresponding stylus.

BACKGROUND

Currently there are a wide variety of electronic devices that have separate pointing devices such as styli, mice, track balls, etc. However, often such pointing devices must be charged before they can be used with the electronic device. Therefore, a user may have to wait to use the electronic device until the pointing device has been charged sufficiently. This can be particularly problematic with tablet computers that can have impaired usefulness while the user is waiting for the stylus to be charged. New electronic devices and corresponding pointing devices are needed that do not have to be charged before use.

SUMMARY

In some embodiments a computing system comprises an enclosure including a housing coupled to a display window and a battery within the enclosure. A plurality of inductive charging transmit coils are coupled to the battery and are positioned within the enclosure to generate an inductive charging region that extends through the display window and across at least a portion of an exterior of the display window. Sensing circuitry is configured to sense a position of a stylus at the display window. A processor is configured to selectively engage one or more of the plurality of inductive charging transmit coils based on the sensed position of the stylus.

In some embodiments the processor is configured to move the inductive charging region to follow the sensed position of the stylus. In various embodiments the processor is configured to communicate with the stylus through the plurality of inductive charging transmit coils. In some embodiments the computing system further comprises a display positioned within the enclosure and positioned adjacent the display window, and a backlight positioned within the enclosure and positioned adjacent the display, wherein the plurality of inductive charging transmit coils are positioned proximate the backlight. In various embodiments the computing system further comprises a ferrite sheet positioned adjacent the plurality of inductive charging transmit coils.

In some embodiments an electronic device comprises an enclosure including a housing coupled to a display window and a plurality of inductive charging transmit coils positioned within the enclosure and configured to generate an inductive charging region that extends through the display window and across at least a portion of an exterior of the display window.

In some embodiments the electronic device includes circuitry configured to sense a position of a separate electronic device positioned proximate the display window and selectively energize one or more inductive charging transmit coils of the plurality of inductive charging transmit coils proximate the sensed position and selectively disable one or more inductive charging transmit coils of the plurality of inductive charging transmit coils spaced apart from the sensed position.

In some embodiments the electronic device is configured to change the selectively energized and selectively disabled one or more inductive charging transmit coils as the sensed position changes. In various embodiments the separate electronic device is a stylus. In some embodiments the inductive charging region is configured to inductively charge the stylus when the stylus is positioned within the inductive charging region. In various embodiments the separate electronic device includes communication circuitry configured to wirelessly transmit data to the electronic device.

In some embodiments the separate electronic device wirelessly transmits the data to the electronic device via the plurality of inductive charging transmit coils. In various embodiments the electronic device further comprises a display positioned within the enclosure and positioned adjacent the display window and a backlight positioned within the enclosure and positioned adjacent the display, wherein the plurality of inductive charging transmit coils are positioned proximate the backlight.

In some embodiments an electronic system comprises an electronic device including an enclosure including a housing coupled to a display window, a display positioned within the enclosure and adjacent the display window, a backlight positioned within the enclosure and adjacent the display, and an inductive charging transmit coil positioned within the enclosure and adjacent the backlight, the inductive charging transmit coil configured to generate an inductive charging region that extends through the display window and across at least a portion of an exterior of the display window. The electronic system further comprises a stylus that includes a tip configured to sensed by the display window, an inductive charging receive coil configured to receive power from the inductive charging transmit coil when the stylus is positioned within the inductive charging region, and a stylus energy storage device configured to store power received by the inductive charging receive coil.

In some embodiments the electronic device includes a plurality of inductive charging transmit coils positioned within the enclosure and arranged such that the charging region extends across a majority of an area of the display. In various embodiments the electronic device includes circuitry configured to sense a position of the stylus at the display and selectively energize one or more inductive charging transmit coils of the plurality of inductive charging transmit coils proximate the sensed position and selectively disable one or more inductive charging transmit coils of the plurality of inductive charging transmit coils spaced apart from the sensed position.

In some embodiments the electronic device changes the selectively energized and selectively disabled one or more inductive charging transmit coils in response to a change in position of the stylus. In various embodiment the stylus includes stylus communication circuitry configured to wirelessly communicate with the electronic device. In some embodiments the stylus communication circuitry wirelessly communicates with the electronic device via the inductive charging transmit coil. In various embodiments the electronic device further includes a ferrite sheet that is positioned adjacent the inductive charging transmit coil and opposite the backlight.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Some embodiments of this disclosure are directed to electronic devices that have a stylus that is inductively charged and/or inductively powered when positioned proximate a screen region of the electronic device. While the present disclosure can be useful for a wide variety of configurations, some embodiments of the disclosure are particularly useful for tablet and laptop computing devices that are commonly equipped with an active stylus configured to electronically communicate with the computing device, as described in more detail below.

For example, in some embodiments an electronic device includes a display screen and one or more inductive charging coils positioned behind the display screen and configured to generate a charging region positioned across an external surface of the display screen. A corresponding stylus can include an inductive receive coil that receives power when positioned within the charging region such that when a user positions the stylus on the display screen the stylus is continuously charged during use. In further embodiments the electronic device and the stylus can establish bi-directional communications through the inductive charging circuit so that communications is only performed when the stylus is in use to reduce power consumption.

In some embodiments the electronic device has one centrally located inductive charging coil positioned behind the display. In various embodiments the electronic device can include a plurality of inductive charging coils to reduce or eliminate regions of low coupling. These features and others will be described in more detail herein.

In order to better appreciate the features and aspects of electronic devices with inductively charged styli according to the present disclosure, further context for the disclosure is provided in the following section by discussing one particular implementation of an electronic device according to embodiments of the present disclosure. These embodiments are for example only and other embodiments can be employed in other electronic devices such as, but not limited to smart phones, watches, portable media players, wireless television devices, computers and other devices.

Figure 1:
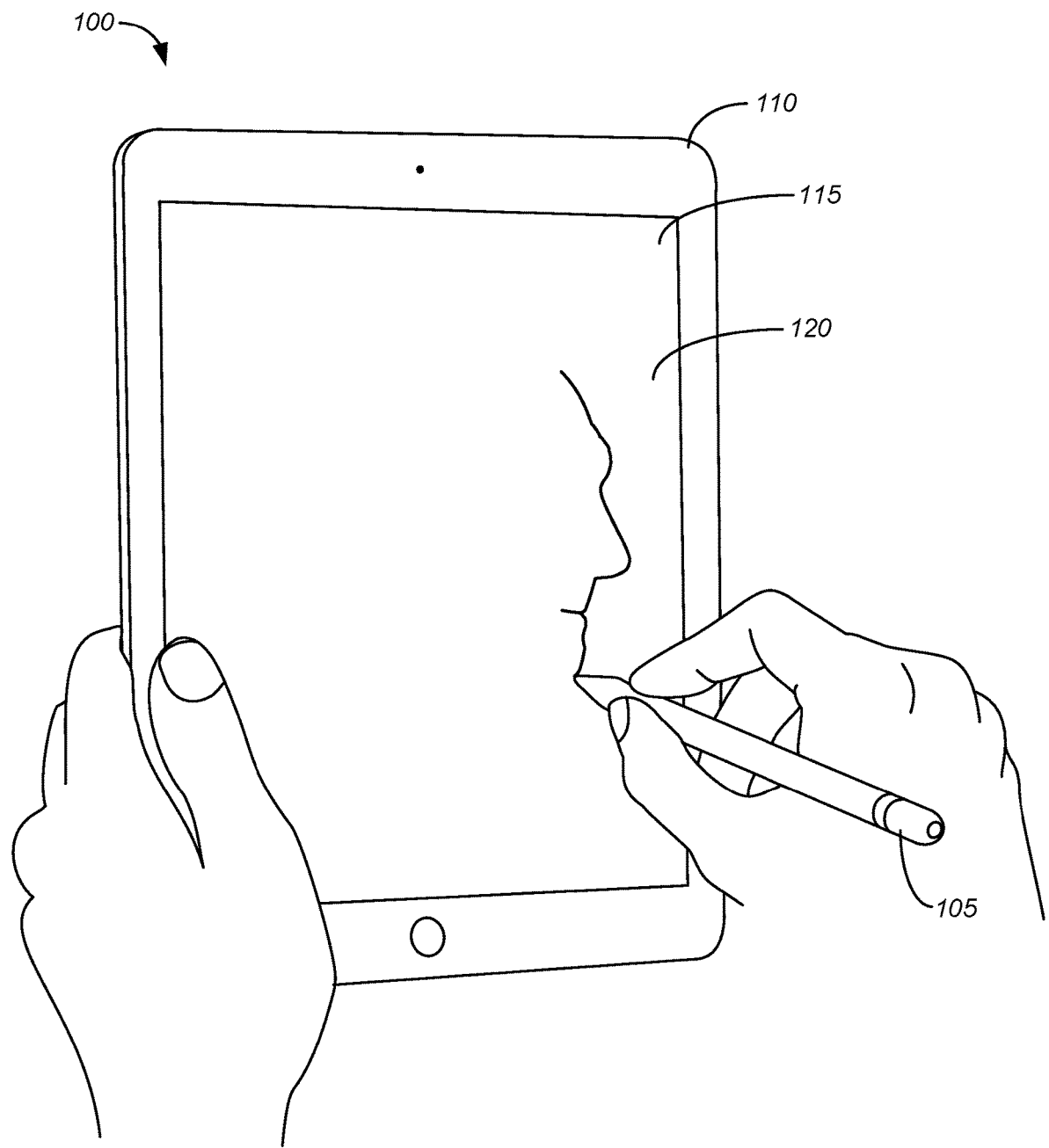
FIG. 1 is a front perspective view of an electronic device with a corresponding inductively charged stylus, according to some embodiments of the disclosure.

FIG. 1 depicts a simplified perspective view of an electronic device 100 and a corresponding inductively charged stylus 105, according to embodiments of the disclosure. As shown in FIG. 1, electronic device 100, which in this example is a tablet computing device, includes an enclosure 110 having a display window 115 that forms a front surface 120 of the enclosure. Electronic device 100 also includes an inductive charging system (not shown in FIG. 1) that transfers power to stylus 105 when it is proximate display window 115. In some embodiments, stylus 105 and electronic device 100 each include data communication circuitry that enable them to perform uni-directional or bi-directional communications with each other, as described in more detail below.

Figure 2:
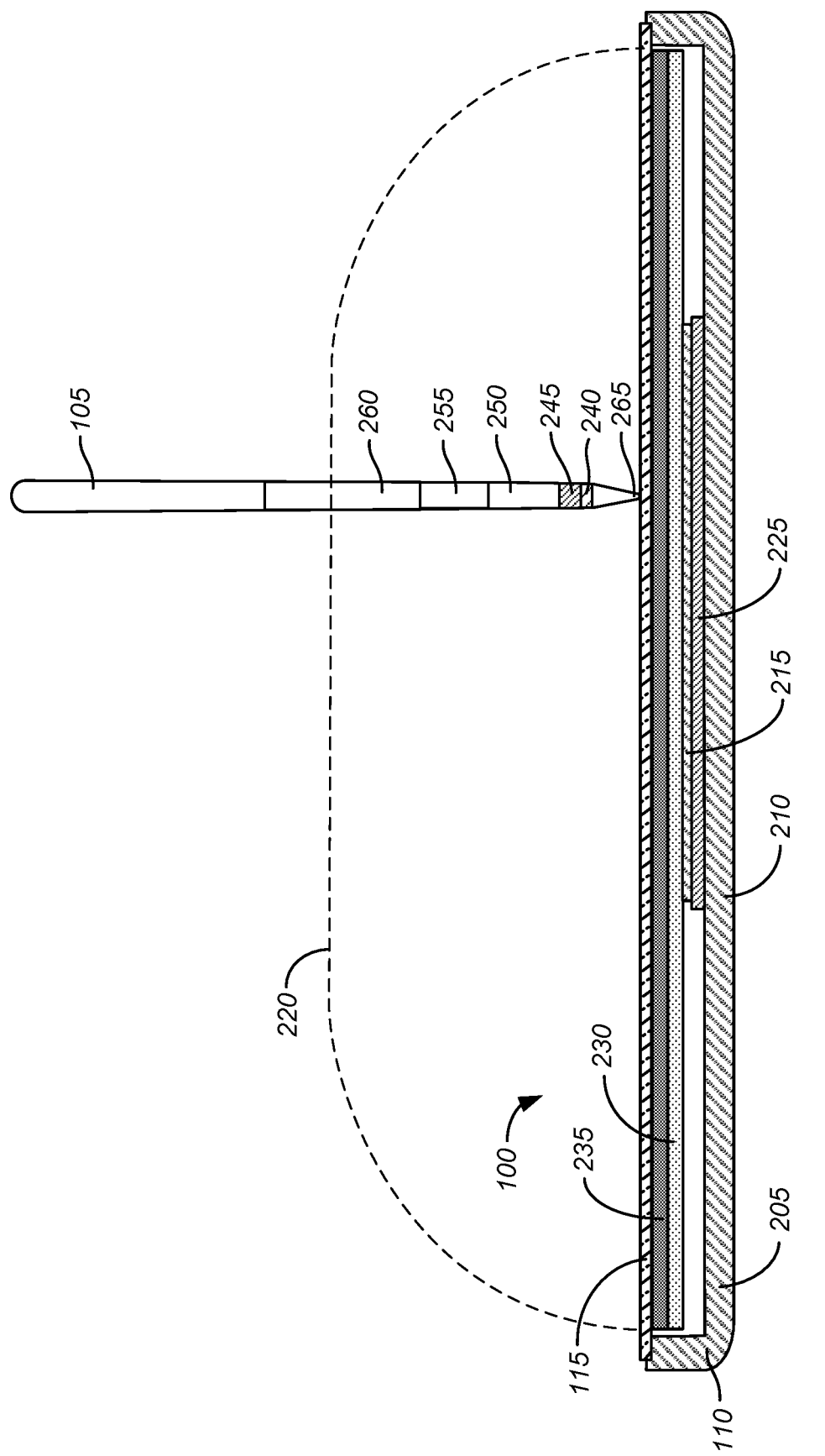
FIG. 2 is a simplified cross-sectional view of the electronic device and stylus shown in FIG. 1.

FIG. 2 illustrates a simplified cross-sectional view of electronic device 100 illustrated in FIG. 1. As shown in FIG. 2, electronic device 100 includes an enclosure 110 formed from display window 115 coupled to a housing 205 that forms a back wall 210 of the electronic device. An inductive charging transmit coil 215 is positioned within enclosure 110 and is disposed behind display window 115. Transmit coil 215 generates a charging region 220 for stylus 105, as described in more detail below. When stylus 105 is positioned within charging region 220, the stylus receives power from transmit coil 215 so it can be continuously charged during use. That is stylus 105 can be continuously charged when the stylus is used to interact with display window 115. In some embodiments this feature eliminates the need for stylus 105 to be charged before each use and can also eliminate the need for a connector on the stylus that is used for charging the stylus. In further embodiments stylus 105 may have a minimal energy storage capacity and can receive continuous power for operation of the stylus when the stylus is positioned within charging region 220.

In some embodiments transmit coil 215 is attached to a ferrite sheet 225 that is positioned behind the charging coil, on a side of the ferrite sheet that is opposite of display window 115. A backlight 230 can be positioned in front of transmit coil 215, on a side nearest display window 115, to provide lighting for the display window. A display 235 can be positioned immediately adjacent display window 115 and can be used to display images to a user through the display window. Display window 115 can form a portion of enclosure 110 and can also include features and circuitry that detect a user's touch and/or a position of stylus 105.

In some embodiments stylus 105 can include an inductive charging receiving coil 240 that receives energy from transmit coil 215. Receive coil 240 can be integrated with a ferrite material 245 to concentrate and direct magnetic flux to the receive coil. Stylus 105 can also include an energy storage device 250 such as a battery or capacitor to store power received from transmit coil 215. In some embodiments stylus 105 can also include circuitry 255 that detects stylus tilt, pressure applied to display 115 with tip 265 and other inputs from a user. Stylus 105 can also include communication circuitry 260 that transmits and/or receives information from electronic device 100. In one example, stylus 105 can sense an increase in pressure applied to display window 115 by a user and transmit data to the electronic device that responds by increasing a line width that is being drawn with stylus 105 on display 115. In some embodiments communication circuitry 260 communicates the data through the inductive charging system, as described in more detail below.

Figure 3:
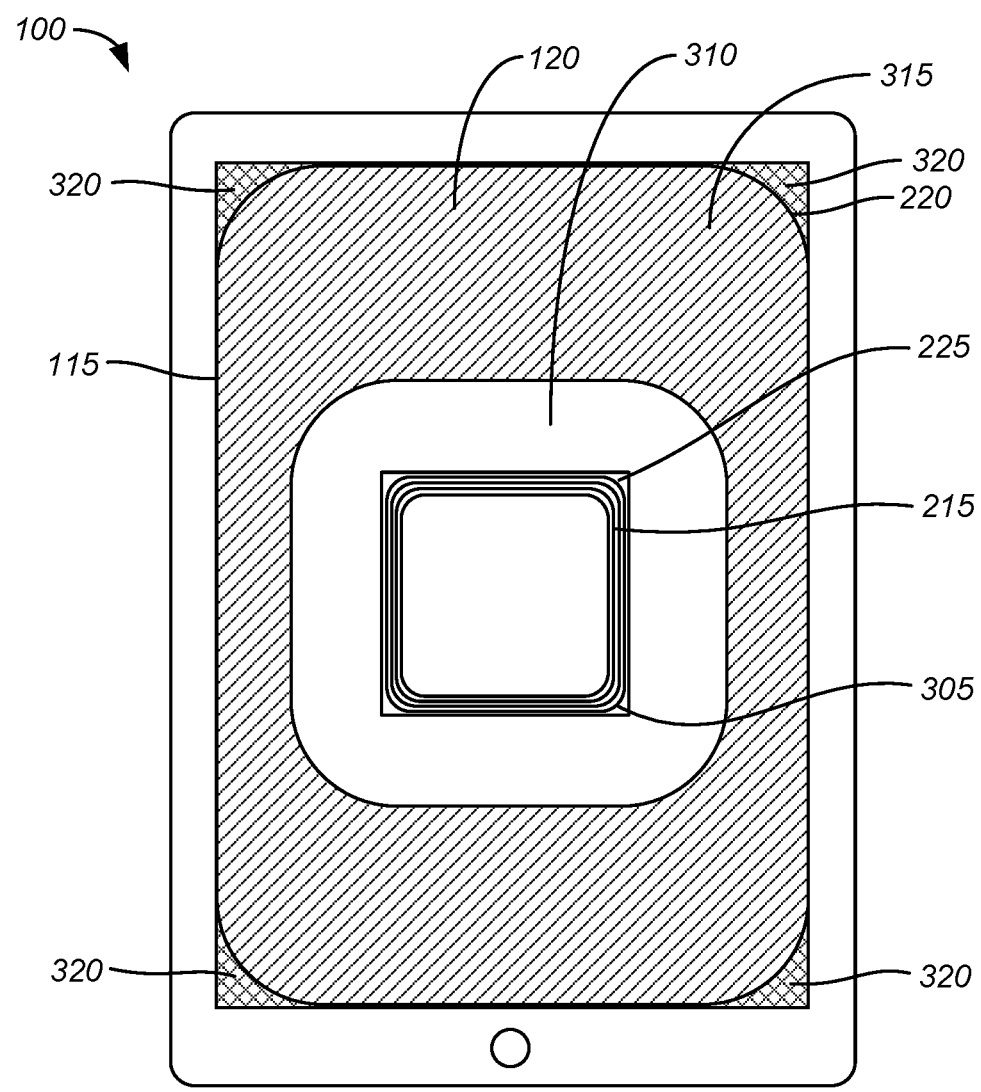
FIG. 3 is a front view of the electronic device shown in FIG. 1.

FIG. 3 illustrates a plan view of front surface 120 of electronic device 100. As shown in FIG. 3, electronic device 100 includes a charging region 220 that is generated by transmit coil 215. When receive coil 240 (see FIG. 2) of stylus 105 is positioned within charging region 220, power is transmitted from electronic device 100 to the stylus. The embodiment illustrated in FIG. 3 has one transmit coil 215 that is positioned approximately in a center of display 115. In some embodiments transmit coil 215 includes seven to ten turns of electrical conductors 305, operates at approximately 1 MHz and is attached to ferrite sheet 225, as described in more detail below.

In some embodiments, a time varying magnetic field within charging region 220 may not be constant. More specifically, with one transmit coil 215 as shown in FIG. 3, charging region 220 can have a high coupling region 310 that is surrounded by a low coupling region 315. Electronic device 100 can be designed such that high coupling region 310 covers an area of display 115 in which a user is most often going to be using stylus 105. In this manner, stylus 105 can receive power directly from transmit coil during the majority of its use. Within low coupling region 315, the power transfer to receive coil 240 in stylus 105 can be reduced and in some embodiments. Stylus 105 can store energy in energy storage device 250 (e.g., a battery) and, if needed can rely on supplemental energy from energy storage device 250 (see FIG. 2) for operation. Due to various design tradeoffs, some embodiments can also have one or more dead zones 320 in which there is little to no coupling of power from transmit coil 215 to receive coil 240. When stylus 105 is positioned in one of dead zones 320, stylus circuitry 255 will consume power stored in energy storage device 250. As stylus 105 is moved out of dead zone 320 and into high coupling region 310, circuitry 255 will recharge energy storage device 250.

In some embodiments transmit coil 215 can be used to provide power to other electronic devices than stylus 105. For example, an inductively charged watch can be placed on display 115 and in response electronic device 100 can selectively engage the appropriate transmit coils to inductively charge the watch. In further embodiments the watch can communicate with electronic device 100 to notify that charging is complete and in response the electronic device can turn off transmit coil 215. Other devices such as, but not limited to, smart phones and portable media players can be inductively charged in a similar fashion.

Figure 4:
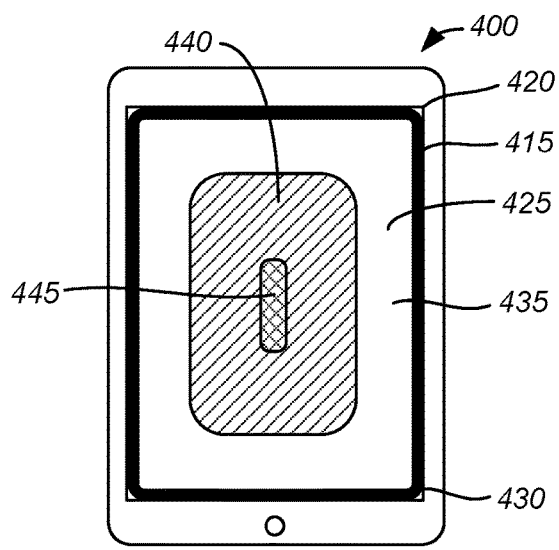
FIG. 4 is a front view of an electronic device that includes an inductive charging coil, according to some embodiments of the disclosure.

FIG. 4 illustrates a plan view of a front surface of another electronic device 400 that inductively charges a stylus, according to embodiments of the disclosure. As shown in FIG. 4, electronic device 400 has a single transmit coil 415 similar to electronic device 100 illustrated in FIG. 3, however in this embodiment transmit coil 415 is substantially larger and is positioned around a perimeter 420 of display window 420. The larger transmit coil 415 generates a charging region 430 having a high coupling region 435 and a low coupling region 440 positioned within the high coupling region. Further, in some embodiments there may be a relatively small dead zone 445 in the middle of low coupling region 440.

Figure 5:
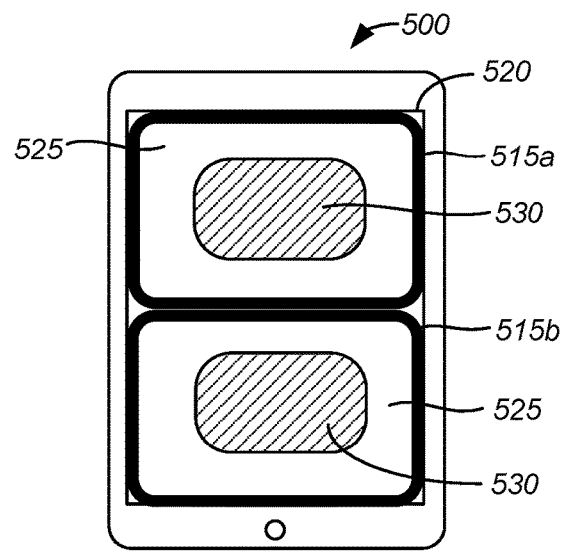
FIG. 5 is a front view of an electronic device that includes two inductive charging coils, according to some embodiments of the disclosure.

FIG. 5 illustrates a plan view of a front surface of another electronic device 500 that inductively charges a stylus, according to embodiments of the disclosure. As shown in FIG. 5, electronic device 500 has a two transmit coils 515a, 515b that are each similar to transmit coil 215 illustrated in FIG. 3, however in this embodiment transmit coils 515a, 515b are larger and are positioned adjacent one another. Transmit coils 515a, 515b generate a charging region 520 having a high coupling regions 525 and low coupling regions 530 positioned within each of the high coupling regions.

In some embodiments where the electronic device includes more than one transmit coil, the electronic device can include detection circuitry that is configured to detect which transmit coil the stylus is over and in response only activate that particular coil. As the stylus moves and is positioned over a different transmit coil the electronic device turns off power to the last transmit coil and turns on power to the new transmit coil that the stylus is placed over. In this way the electronic device can conserve power by only operating the minimum number of transmit coils required to charge the stylus. In various embodiments the electronic device can detect which transmit coil the stylus is directly over and turn on one or more adjacent transmit coils so multiple transmit coils in the region of the stylus are on at the same time. As the stylus is moved some of the coils will be turned off and new coils will be turned on so multiple coils are always on in the region of the stylus. In further embodiments, the stylus detect feature can be used to turn off all transmit coils when no stylus is detected in the charging region and when the stylus is detected in the charging region to automatically form a communications link with the stylus and activate the appropriate transmit coil, or combination of coils.

Figure 6:
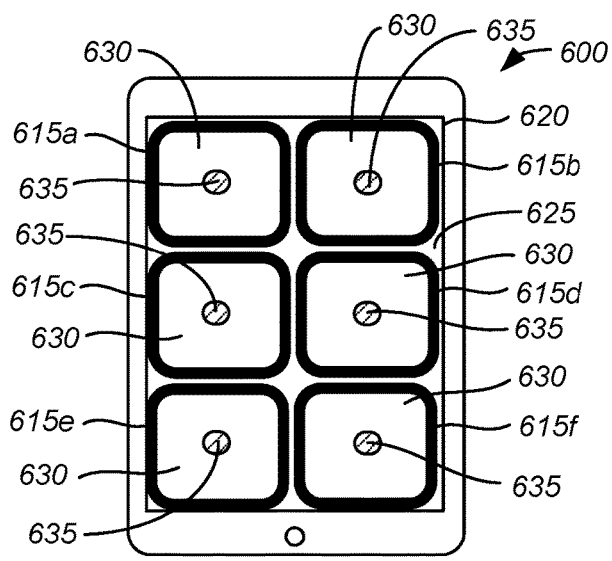
FIG. 6 is a front view of an electronic device that includes six inductive charging coils, according to some embodiments of the disclosure.

FIG. 6 illustrates a plan view of a front surface of another electronic device 600 that inductively charges a stylus, according to embodiments of the disclosure. As shown in FIG. 6, electronic device 600 has a six transmit coils 615a-615f that are each similar to transmit coil 215 illustrated in FIG. 3, however in this embodiment the six transmit coils are positioned adjacent one another in two columns and three rows, evenly distributed across display 620. Transmit coils 615a-615f generate a charging region 625 having high coupling regions 630 and low coupling regions 635 positioned within each of the high coupling regions. In some embodiments the use of six transmit coils 615a-615f can provide substantially uniform coverage of display 620 with a high coupling region while using a minimal quantity of transmit coils 615a-615f.

Figure 7:
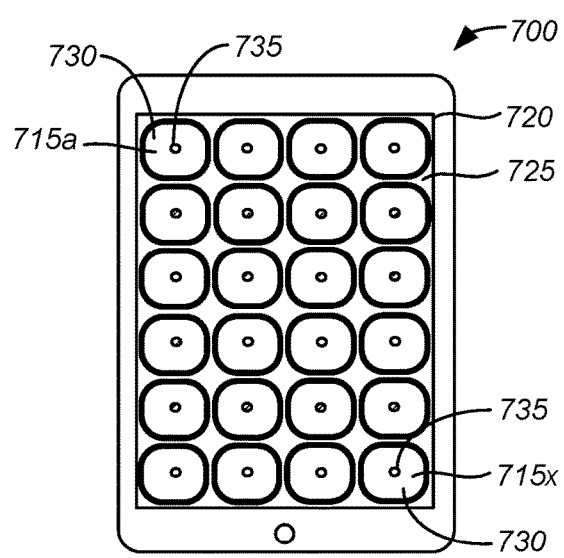
FIG. 7 is a front view of an electronic device that includes twenty-four inductive charging coils, according to some embodiments of the disclosure.

FIG. 7 illustrates a plan view of a front surface of another electronic device 700 that inductively charges a stylus, according to embodiments of the disclosure. As shown in FIG. 7, electronic device 700 has a twenty four transmit coils 715a-715x that are each similar to transmit coil 215 illustrated in FIG. 3, however in this embodiment the twenty four transmit coils are smaller and are positioned adjacent one another in four columns and six rows, evenly distributed across display 720. Transmit coils 715a-715x generate a charging region 725 having high coupling regions 730 and low coupling regions 735 positioned within each of the high coupling regions. In some embodiments the use of twenty-four transmit coils 715a-715x can provide more uniform coverage of display 720 with a high coupling region than any of the previously discussed transmit coil configurations. Additionally, low coupling regions 735 are sufficiently small and sufficiently separated by high coupling regions 730 that, during typical use, stylus 105 will be regularly positioned within a high coupling region. Thus, during normal operation stylus 105 should receive sufficient charge to both operate and keep energy storage device 250 sufficiently charged to enable stylus 105 to operate normally as it is moved into and out of the low coupling regions.

In some embodiments the transmit coils described above are configured to generate an inductive charging region that covers at least fifty percent of an area of display 115 (see FIG. 1), while in other embodiments they generate an inductive charging region the covers at least seventy-five percent of the area of the display and in other embodiments they generate an inductive charging region that covers at least ninety percent of the area.

In some embodiments the transmit coils described above are manufactured using a one layer process in which the individual electrical conductors are substantially coplanar. In some embodiments the electrical conductors for the coils are first deposited with an electroless copper deposition process then are increased in thickness with an electrolytic copper deposition process. In various embodiments photolithographic processes are used to define the transmit coil geometry. In another embodiment the electrical conductors can be formed on a rigid or flexible circuit board and attached to the ferrite substrate.

In some embodiments the electrical conductors can be printed on the ferrite substrate using an electrically conductive ink, that contains silver, copper, graphene or other conductive particulates. In further embodiments a copper sheet can be bonded to the ferrite and the electrical conductors can be defined with a copper removal process such as photolithography, laser ablation, or other process. In some embodiments a copper foil can first be patterned with the electrical conductors using stamping, forming or a cutting process, then bonded to the ferrite sheet. In some embodiments copper wires can be formed and bonded to the ferrite sheets. In further embodiments the electrical conductors can be deposited on the ferrite sheets using a copper spray process. In some embodiments, a catalytic polymer ink is coated, which allows electroless copper to be deposited. In some embodiments the electrical conductors can be defined and grown on a plastic substrate using laser direct structuring (LDS) and bonded to the ferrite substrate.

Figure 8:
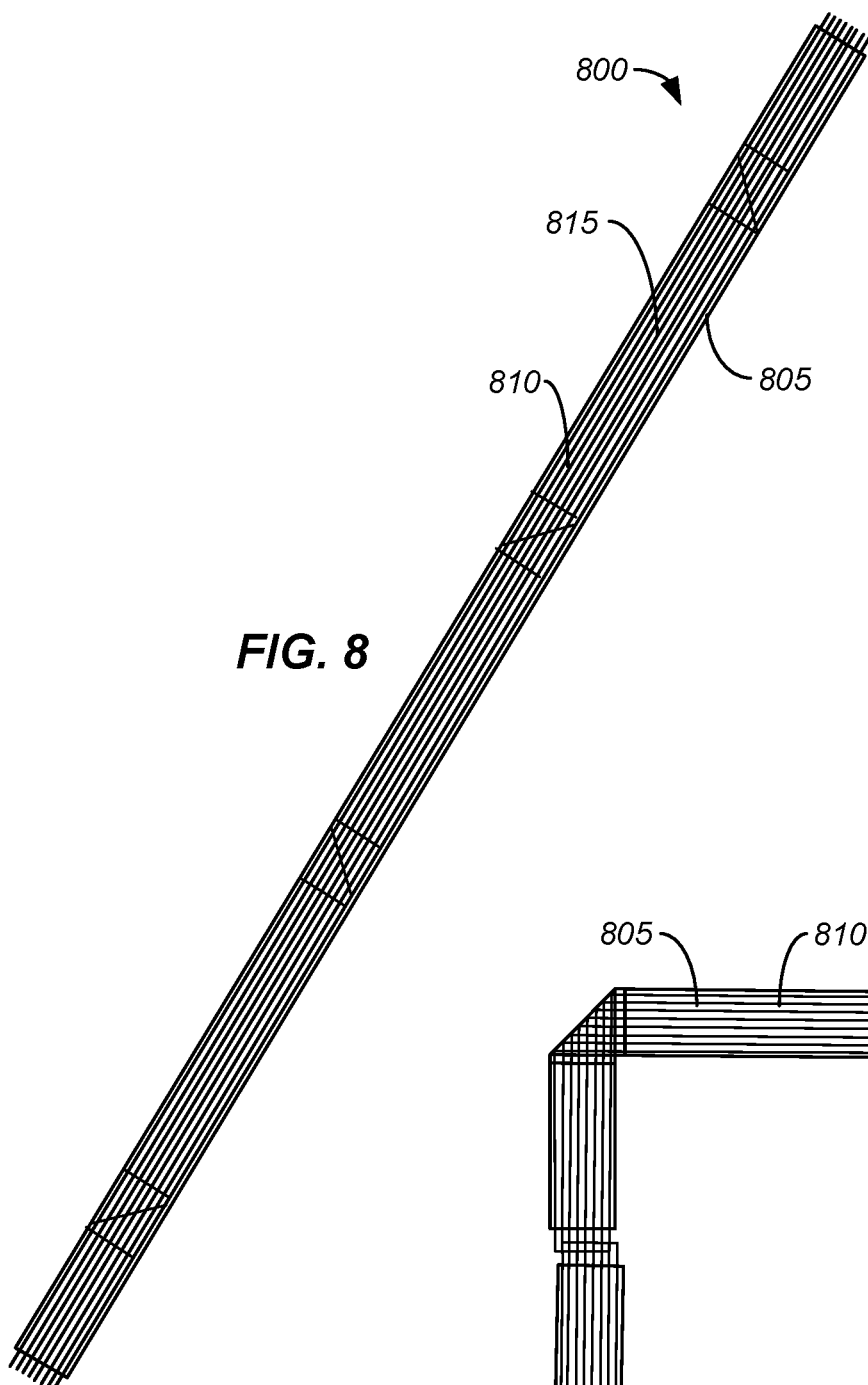
FIG. 8 is a top view of an a flexible circuit that can be used to make an inductive charging coil, according to some embodiments of the disclosure.
Figure 9:
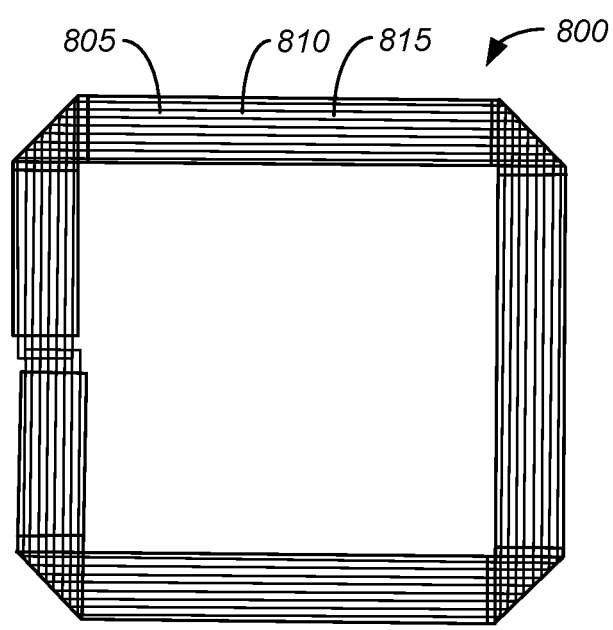
FIG. 9 is a top view of the flexible circuit shown in FIG. 8 after it is folded into the shape of an inductive charging coil.

FIGS. 8 and 9 illustrate a transmit coil 800 that can be made with a flexible circuit 805. As shown in FIG. 8, a plurality of parallel electrical conductors 810 are deposited on a flexible substrate 815. In some embodiments electrical conductors 810 can be plated copper traces and flexible substrate 815 can be kapton, polyamide or other dielectric material. As shown in FIG. 9, flexible circuit 805 can be folded in such a way as to make a coil including multiple coplanar turns. The turns can be interconnected by electrically coupling traces on one end to traces on the opposite end where each coil is connected to an adjacent coil to make a continuous winding. Flexible circuit 805 can then be bonded to a ferrite substrate.

Figure 10:
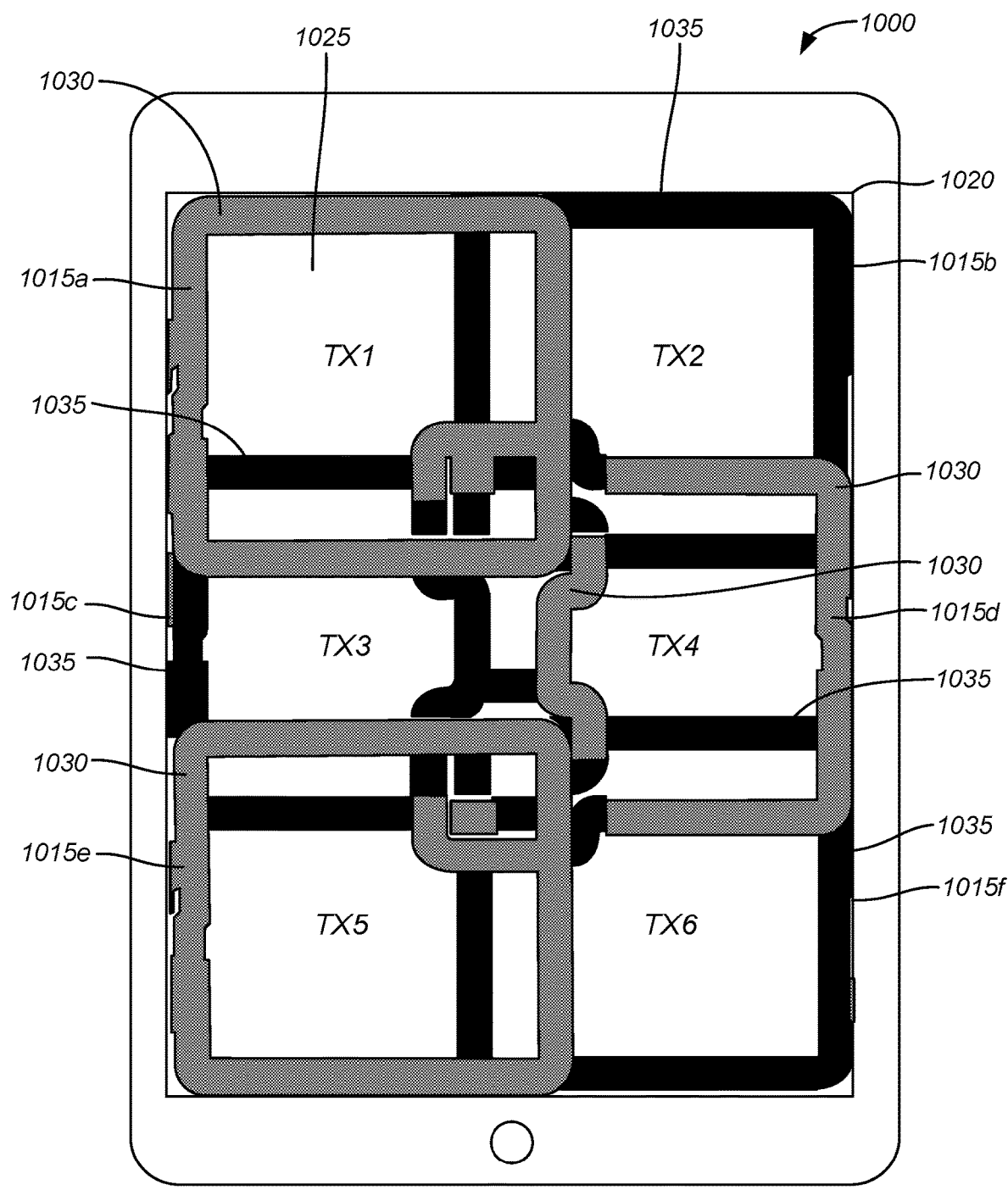
FIG. 10 is a front view of an electronic device that includes six overlapping inductive charging coils formed on two layers, according to some embodiments of the disclosure.

FIG. 10 illustrates a plan view of a front surface of another electronic device 1000 that inductively charges a stylus using transmit coils formed on two layers, according to embodiments of the disclosure. As shown in FIG. 8, electronic device 1000 has six transmit coils 1015a-1015f (labeled TX1 through TX6) that are each similar to transmit coil 215 illustrated in FIG. 3, however in this embodiment the six transmit coils are manufactured with a two layer process so they overlap in the vertical and horizontal directions and are arranged in two columns and three rows, distributed across display 1020. The overlapping nature of transmit coils 1015a-1015f results in charging region 1025 to be more evenly distributed across display 1020, resulting in fewer or no low coupling regions.

In this particular embodiment, transmit coils 1015a-1015f are deposited on two separate layers. A first layer 1030 is deposited on ferrite substrate and is covered with a dielectric material with a catalytic ink. Then, a second layer 1035 is deposited on the dielectric material with a catalytic ink. In some embodiments the conductors for the coils are first deposited with an electroless copper deposition process then are increased in thickness with an electrolytic copper deposition process. Photolithographic processes are used to define the coil geometry for the first and second coils. To interconnect the first and the second layers, photolithographic or lasered openings in the dielectric layer can be used, or vias can be formed between the first and the second layers.

In further embodiments, transmit coils that are deposited on two layers can use any of the one layer processes described above with an intermediate dielectric layer disposed between the two transmit coil layers. Vias or any other type of interconnect can be used to interconnect the transmit coils.

Figure 11:
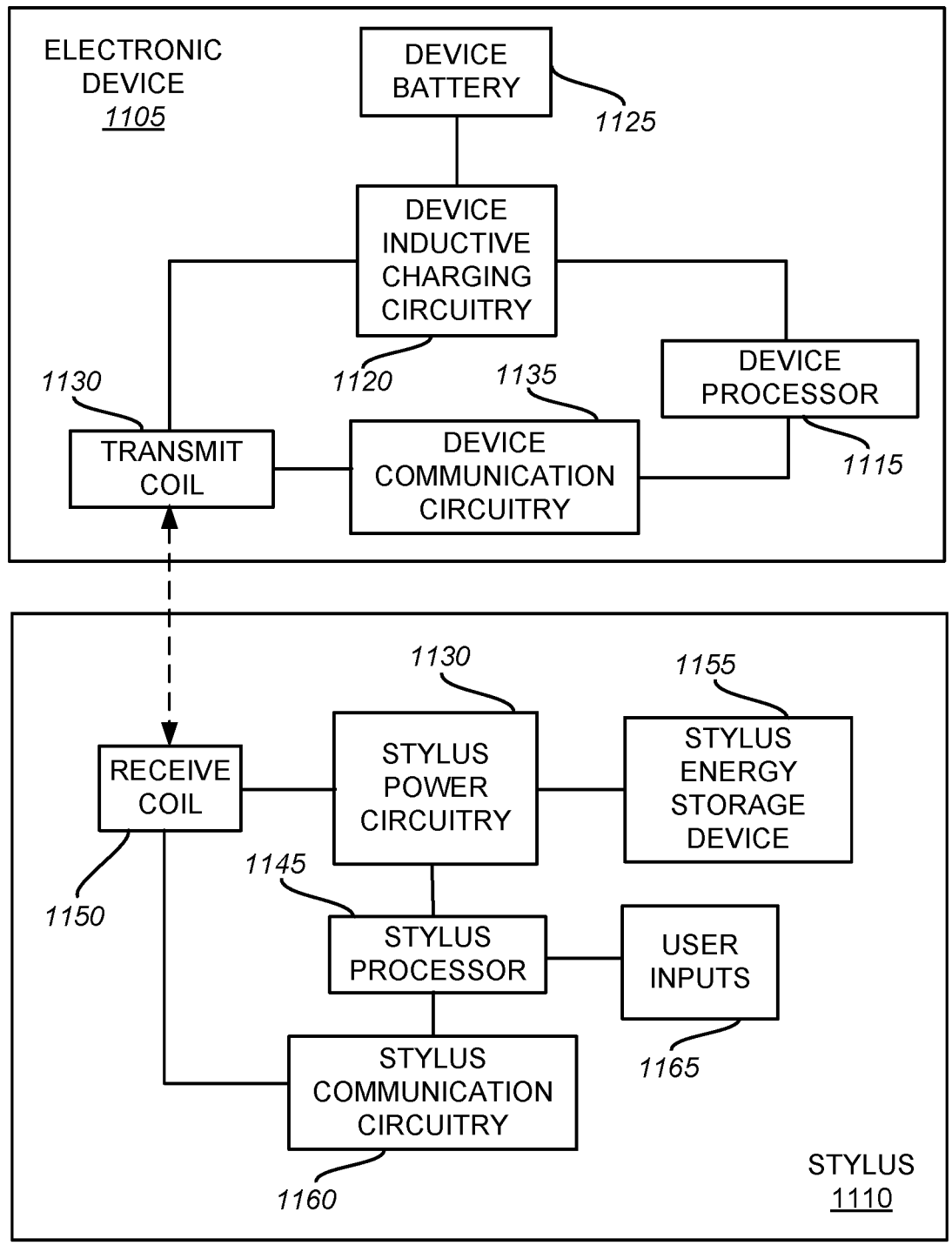
FIG. 11 is system that includes an electronic device that inductively charges a stylus, according to some embodiments of the disclosure.

FIG. 11 illustrates system 1100 according to an embodiment of the present disclosure. System 1100 includes electronic device 1105 and corresponding stylus 1110. In some embodiments, electronic device 1105 can be a tablet computer such as an iPad™, or it can be any type of smart phone, media player or other computing device. Stylus 1110 can be any type of pen or pointing device that is adapted to interoperate with electronic device 1105.

Electronic 1105 includes a device processor 1115 that can execute one or more instructions. In some embodiments device processor 1115 can have an internal memory while in other embodiments it can be coupled to a separate memory device (not shown in FIG. 11). Device processor 1115 can be coupled to device inductive charging circuitry 1120 to transmit electromagnetic energy that is received by a separate electronic device, such as stylus 1110, and used to charge or power the separate electronic device. More specifically, device inductive charging circuitry 1120 can control power supplied from device battery 1125 to transmit coil 1130, which can generate a time varying electromagnetic signal. The time varying electromagnetic signal can wirelessly transfer charging power to the separate electronic device that can receive the charging power with a receive coil, described in more detail below.

Device processor 1115 can also be coupled to device communication circuitry 1135 that is coupled to transmit coil 1130. In some embodiments device processor 1115 can communicate uni-directionally or bi-directionally with a separate electronic device through device communication circuitry 1135, which transmits and receives communications through transmit coil 1130. More specifically, device processor 1115 can communicate through transmit coil 1130 that is also used to transfer electromagnetic energy to a separate electronic device. In some embodiments the communication signal can be sent on a different frequency than the power transfer frequency, while in other embodiments the communication can be modulated into the charging frequency so that the data is communicated on the same frequency as the charging frequency.

Stylus 1110 can include a stylus processor that is configured to execute one or more instructions and is coupled to stylus power circuitry 1140. In some embodiments stylus processor 1145 can have an internal memory while in other embodiments it can be coupled to a separate memory device (not shown in FIG. 11). Stylus power circuitry 1130 can be coupled to and configured to receive power from receive coil 1150. Under the control of stylus processor 1145, stylus power circuitry 1130 can transfer power to stylus energy storage device 1155. Power can also be transferred from energy storage device 1155 by stylus power circuitry 1130 to stylus processor 1145. Energy storage device 1155 can be any type of energy storage device including, but not limited to, a capacitor or a battery. Energy storage device 1155 can have any suitable energy storage capacity and in some embodiments can have a minimal energy storage capacity that is adequate to maintain operation of stylus 1110 while receiving continuous power from transmit coil 1130. In other embodiments energy storage device 1155 can have a substantial energy capacity enabling operation of stylus 1110 for numerous hours without receiving supplemental power.

In some embodiments, stylus processor 1145 can communicate to a separate electronic device, such as electronic device 1105, through stylus communication circuitry 1160 that transmits and receives data through receive coil 1150. Stylus 1110 can also have one or more user inputs 1165 such as one or more buttons, pressure sensors, position sensors or other type of user input device. User inputs 1165 can be coupled to stylus processor 1145 that can respond to the one or more user inputs in myriad ways including sending data through stylus communication circuitry to receive coil and out to electronic device 1105.

In further embodiments stylus communication circuitry 1160 and device communication circuitry 1135 can communicate without going through receive coil 1150 and transmit coil 1130, respectively. More specifically in some embodiments stylus communication circuitry 1160 and device communication circuitry 1130 can operate using a wireless protocol such as Bluetooth, Zigbee or other communication protocol.

In some embodiments electronic device 1105 can sense stylus 1110 when stylus is positioned within a charging region, such as region 220 illustrated in FIG. 2. Upon sensing stylus 1110, electronic device 1105 can respond by energizing transmit coil 1130 and transferring power to stylus 1110 that can be used to charge stylus energy storage device 1155. In embodiments where electronic device 1105 has more than one coil, only the specific coil that is used to charge stylus 1110 is energized and all the other transmit coils are turned off. As stylus 1110 is moved by a user over a new coil, the new coil is energized and the previous coil is turned off.

In this way electronic device 1105 can conserve power and only transmit energy to stylus 1110 through the transmit coil that is closest in proximity to stylus 1110. In further embodiments electronic device 1105 can energize all coils. In some embodiments electronic device 1105 can sense stylus 1110 with transmit coil 1130, while in other embodiments it can sense the stylus using any other technique including knowing where the stylus is making contact with a display of the electronic device (e.g., drawing a line on the display).

In some embodiments one or more transmit coils form a charging region over the display area that has enough power to charge stylus 1110 in any location on the display so that the stylus does not require energy storage device x and runs entirely off power transmitted from electronic device 1105.

In some embodiments electronic device 1105 can detect when stylus 1110 is within a charging region, such as charging region 220 illustrated in FIG. 2, and perform a handshaking algorithm to pair stylus 1110 to electronic device 1105 so unidirectional or bidirectional communications can occur. In some embodiments this feature can conserve power since electronic device 1105 only communicates with stylus 1110 while it is in the charging region when a user is using it to interact with a display.

In some embodiments when stylus 1110 is detected by electronic device 1105, bidirectional communication can occur between the stylus and the electronic device through the one or more transmit coils 1130. In various embodiments stylus 1110 can have its own data communication coil, however in other embodiments stylus communications through receive coil 1150. In some embodiments the communication between stylus 1110 and electronic device 1105 follows the same pattern as the power and data transfer where communication is only performed with the particular transmit coil that stylus 1110 is positioned over. As stylus 1110 moves, the first transmit coil can be turned off and the data communications is picked up by a new transmit coil.

Although electronic device 100 (see FIG. 1) and stylus 105 are described and illustrated as one particular type of electronic device, embodiments of the disclosure are suitable for use with a myriad electronic devices. For example, any device that receives or transmits audio, video or data signals can be used with embodiments of the disclosure. In some instances, embodiments of the disclosure are particularly well suited for use with portable electronic media devices because of their potentially small form factor and need for aesthetically appealing enclosures.

As used herein, an electronic media device includes any device with at least one electronic component that can be used to present human-perceivable media. Such devices can include, for example, portable music players (e.g., MP3 devices and Apple's iPod devices), portable video players (e.g., portable DVD players), cellular telephones (e.g., smart telephones such as Apple's iPhone devices), video cameras, digital still cameras, projection systems (e.g., holographic projection systems), gaming systems, PDAs, as well as tablet (e.g., Apple's iPad devices), laptop or other mobile computers. Some of these devices can be configured to provide audio, video or other data or sensory output.

For simplicity, various internal components, such as the AC/DC converter circuitry, power transfer circuitry, internal connectors and other components of electronic devices 100 and stylus x (see FIG. 1) are not shown in the figures.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

What is claimed is:

1. A computing system comprising:
   an enclosure including a housing coupled to a display window;
   a battery within the enclosure;
   a plurality of inductive charging transmit coils coupled to the battery and positioned within the enclosure adjacent the display window to generate an inductive charging region that extends through the display window and across at least a portion of an exterior of the display window;
   sensing circuitry positioned at the display window and configured to sense a position of a stylus at the display window, wherein the sensing circuitry is separate from the inductive charging transmit coils; and
   a processor configured to selectively engage one or more of the plurality of inductive charging transmit coils based on the sensed position of the stylus.

2. The computing system of claim 1 wherein the processor is configured to move the inductive charging region to follow the sensed position of the stylus.

3. The computing system of claim 1 wherein the processor is configured to communicate with the stylus through the plurality of inductive charging transmit coils.

4. The computing system of claim 1 further comprising a display positioned within the enclosure and positioned adjacent the display window; and
   a backlight positioned within the enclosure and positioned adjacent the display, wherein the plurality of inductive charging transmit coils are positioned proximate the backlight.

5. The computing system of claim 1 further comprising a ferrite sheet positioned adjacent the plurality of inductive charging transmit coils.

6. An electronic device comprising:
   an enclosure including a housing coupled to a display window; and
   a plurality of inductive charging transmit coils positioned within the enclosure and configured to generate an inductive charging region that extends through the display window and across at least a portion of an exterior of the display window; and
   a processor configured to selectively energize one or more of the plurality of inductive charging transmit coils based on a sensed position of a separate electronic device.

7. The electronic device of claim 6 wherein the electronic device includes circuitry configured to sense a position of the separate electronic device when positioned proximate the display window and selectively energize one or more inductive charging transmit coils of the plurality of inductive charging transmit coils proximate the sensed position and selectively disable one or more inductive charging transmit coils of the plurality of inductive charging transmit coils spaced apart from the sensed position.

8. The electronic device of claim 7 configured to change the selectively energized and selectively disabled one or more inductive charging transmit coils as the sensed position changes.

9. The electronic device of claim 7 wherein the separate electronic device is a stylus.

10. The electronic device of claim 9 wherein the inductive charging region is configured to inductively charge the stylus when the stylus is positioned within the inductive charging region.

11. The electronic device of claim 7 wherein the separate electronic device includes communication circuitry configured to wirelessly transmit data to the electronic device.

12. The electronic device of claim 11 wherein the separate electronic device wirelessly transmits the data to the electronic device via the plurality of inductive charging transmit coils.

13. The electronic device of claim 6 further comprising a display positioned within the enclosure and positioned adjacent the display window;
   a backlight positioned within the enclosure and positioned adjacent the display, wherein the plurality of inductive charging transmit coils are positioned proximate the backlight.

14. An electronic system comprising:
   an electronic device including:
      an enclosure including a housing coupled to a display window;
      a display positioned within the enclosure and adjacent the display window;
      a backlight positioned within the enclosure and adjacent the display;
      a processor; and
      an inductive charging transmit coil positioned within the enclosure and adjacent the backlight, the inductive charging transmit coil configured to generate an inductive charging region that extends through the display window and across at least a portion of an exterior of the display window;
   a stylus including:
      a tip configured to be sensed by the display window, wherein the display window is separate from the inductive charging transmit coil;
      an inductive charging receive coil configured to receive power from the inductive charging transmit coil when the stylus is positioned within the inductive charging region; and
      a stylus energy storage device configured to store power received by the inductive charging receive coil;
   wherein the processor is configured to energize the inductive charging transmit coil based on a sensed position of the stylus.

15. The electronic system of claim 14 wherein the electronic device includes a plurality of inductive charging transmit coils positioned within the enclosure and arranged such that the charging region extends across a majority of an area of the display.

16. The electronic system of claim 15 wherein the electronic device includes circuitry configured to sense the position of the stylus at the display and selectively energize one or more inductive charging transmit coils of the plurality of inductive charging transmit coils proximate the sensed position and selectively disable one or more inductive charging transmit coils of the plurality of inductive charging transmit coils spaced apart from the sensed position.

17. The electronic system of claim 16 wherein the electronic device changes the selectively energized and selectively disabled one or more inductive charging transmit coils in response to a change in position of the stylus.

18. The electronic system of claim 14 wherein the stylus includes stylus communication circuitry configured to wirelessly communicate with the electronic device.

19. The electronic system of claim 18 wherein the stylus communication circuitry wirelessly communicates with the electronic device via the inductive charging transmit coil.

20. The electronic system of claim 14 wherein the electronic device further includes a ferrite sheet that is positioned adjacent the inductive charging transmit coil and opposite the backlight.

* * * * *